April 26, 1932.　　　C. T. PFLUEGER　　　1,856,043

FISHING TACKLE

Filed Sept. 27, 1929

INVENTOR

CHARLES T. PFLUEGER.

BY Ely Barrow

ATTORNEYS.

Patented Apr. 26, 1932

1,856,043

UNITED STATES PATENT OFFICE

CHARLES T. PFLUEGER, OF AKRON, OHIO, ASSIGNOR TO THE ENTERPRISE MANUFACTURING COMPANY, OF AKRON, OHIO, A CORPORATION OF OHIO

FISHING TACKLE

Application filed September 27, 1929. Serial No. 395,496.

The present invention relates to fishing tackle and particularly to casting or trolling baits or lures. The object of the invention is to design and construct a new and improved form of fishing tackle in which there is combined with a spinner and its shaft, a flexible or swinging hook. The invention comprises the provision of means for maintaining the hook in its proper position with respect to the spinner shaft and to the line so that it cannot become entangled therewith. The invention also provides means for preventing the hook from becoming cocked with respect to the shaft, whereby it will at all times be in correct position and retain its flexibility on the shaft. In the ordinary connection between the hook and the remainder of the tackle, the hook will readily assume a forwardly inclined or angular position with respect to the shaft or leader upon which it is mounted so that the eye of the hook and the eye of the leader will hold the hook in that position, and the device of the present invention prevents such action.

It will be understood that the invention may be embodied in different specific forms from that shown herein, and it is not the intention to limit the invention to exact conformity with the details shown and described herein.

In the drawings in which the preferred form of the invention is illustrated:

Figure 1:
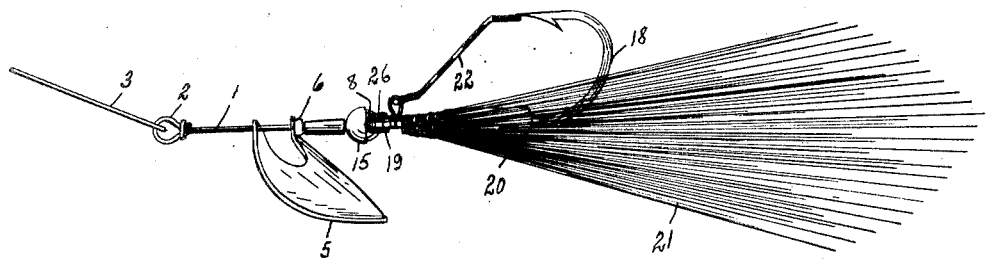
Figure 1 is a side view of the bait assembly showing the improved attachment thereon.
Figure 2:
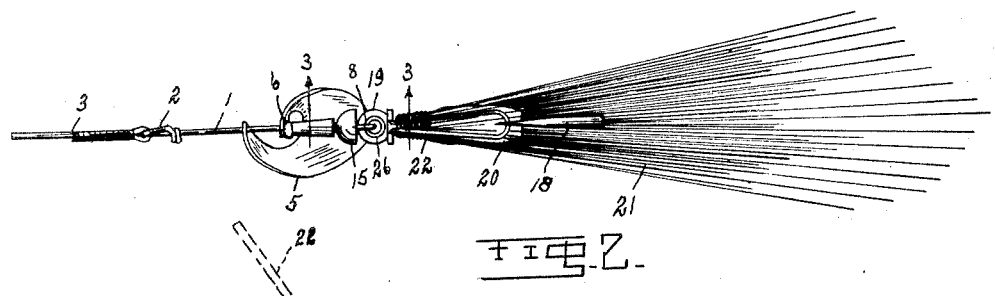
Figure 2 is a plan view.

The spinner shaft is indicated by the numeral 1, having an eye 2 at the forward end thereof, to which the line 3 is attached. On the shaft is journaled the revolving spinner or spoon 5 of any desired or preferred type, a loose bead 6 being located below the spinner. The rear end of the shaft is provided with an integral loop or eye 8, the body of which is substantially circular. The end of the wire comprising the shaft is formed as a catch, and the tail 9 of the wire extends forwardly along the shaft and is provided with a tapering end. On the tail portion of the wire shaft is located a hump 10 adapted to engage and frictionally hold the interior surface of a sliding locking sleeve 12. The sleeve 12 is movable upwardly on the shaft to release the eye portion of the wire.

Between the eye 8 and the hump 10 is a recess 14 and surrounding the upper portion of the eye is a semi-spherical or bell-shaped cup 15 having a central aperture receivable over the catch and movable over the catch when the sleeve is released. As the cup is moved to its operative position, as shown in Figure 3, it depresses the catch and snaps into the recess 14 so that it is retained therein, both by the sleeve 12, when the same is properly located, and by the hump.

The hook is indicated by the numeral 18, the upper end of the hook being formed with the usual eye 19 interengaged with the eye 8. The hook is shown with a keel 20, bucktail or other lure 21 and with a pivoted spring actuated weed guard 22, the latter being supported on a plate 24 which is formed with a loop 25 to provide a support for the guard. A tubular rivet 26 provides means for attachment of the plate to the eye of the hook. This weed guard may be omitted if desired, as it forms no part of the present invention.

Figure 3:
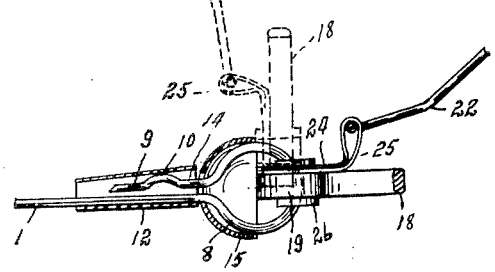
Figure 3 is an enlarged section through the hook connection taken on the line 3—3 of Figure 2.

It will be observed that normally the eye of the hook is at right angles to the eye of the shaft or leader and that the hook has free movement on the shaft, through approximately 180° in any direction and in any plane, but that further movement of the hook is prevented by contact of the eye with the rim of the bell-shaped cup 15, as shown by dotted lines in Figure 3. This will effectively prevent cocking of the hook or entanglement of the hook with the line or other parts of the tackle. The bell alone will hold the eye of the leader or shaft closed, but the sliding sleeve is added for the purpose of enclosing the catch and providing a further securing device. The hook may be easily removed by sliding sleeve 12 forwardly from the catch 10 and snapping the cup 15 forwardly over the catch 10, whereupon the hook may be slipped off the loop 8.

What is claimed is:

1. The combination with a shaft, the end of which is bent upon itself to form an eye, a tail having a hump thereon to constitute a catch, a hook pivotally mounted on the eye, a cup having an aperture therein received over the shaft and below the hump by which it is retained, the rim of the cup limiting the angular position of the hook, and a locking sleeve above the cup, the sleeve being movable over the shaft and engageable with the catch.

2. The combination with a shaft, the end of which is bent upon itself to form an eye, a tail having a hump thereon to constitute a spring catch, a hook pivotally mounted on the eye, a cup having an aperture therein received over the shaft and below the hump by which it is retained, the rim of the cup limiting the angular position of the hook, and a locking sleeve above the cup, the sleeve being movable over the shaft and engageable with the catch.

CHARLES T. PFLUEGER.